United States Patent
Torney et al.

(10) Patent No.: US 9,191,279 B1
(45) Date of Patent: Nov. 17, 2015

(54) SYSTEMS AND METHODS FOR DATA LOSS PREVENTION

(75) Inventors: Milind Torney, Maharashtra (IN);
Piyush Sharma, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 338 days.

(21) Appl. No.: 13/484,752

(22) Filed: May 31, 2012

(51) Int. Cl.
*G06F 17/30* (2006.01)
*H04L 12/24* (2006.01)
*G06F 21/62* (2013.01)

(52) U.S. Cl.
CPC ...... *H04L 41/0893* (2013.01); *G06F 17/30082* (2013.01); *G06F 21/6218* (2013.01)

(58) Field of Classification Search
CPC .................. G06F 17/30221; G06F 17/30082; G06F 17/30067; G06F 21/6218; G06F 21/31; G06F 21/62; G06F 11/1435; G06F 17/30; G06F 17/30336; G06F 21/604; G06F 11/3438; G06F 17/3007; G06F 21/00; G06F 21/554; G06F 21/64; G06F 2201/84; G06F 2221/2141; Y10S 707/956; H04L 63/20; H04L 63/10; H04L 41/0893
USPC ....................................................... 707/694
See application file for complete search history.

(56) References Cited

U.S. PATENT DOCUMENTS

| | | | |
|---|---|---|---|
| 2005/0288939 A1* | 12/2005 | Peled et al. | 705/1 |
| 2006/0080308 A1* | 4/2006 | Carpentier et al. | 707/3 |
| 2009/0171957 A1* | 7/2009 | Havewala et al. | 707/6 |
| 2010/0145917 A1* | 6/2010 | Bone et al. | 707/694 |
| 2011/0099200 A1* | 4/2011 | Blount et al. | 707/770 |
| 2013/0227714 A1* | 8/2013 | Gula et al. | 726/32 |
| 2013/0283339 A1* | 10/2013 | Biswas et al. | 726/1 |

OTHER PUBLICATIONS

CISCO; Using Management Center for Cisco Security Agents; Chapter 16; OL-18680-01; Oct. 22, 2009; http://www.cisco.com/en/US/docs/security/csa/csa601/user_guide/Data_Classification.pdf.
"Using Management Center for Cisco Security Agents 6.0.1", http://www.cisco.com/en/US/docs/security/csa/csa601/user_guide/Data_Classification.pdf, as accessed Mar. 13, 2012, Cisco Systems, Inc., (May 1, 2009).
"Deep Content Fingerprinting the Key to Enterprise Content Security", http://www.engage2day.com/about/articles-and-whitepapers/FingerprintingWhitePaper.pdf, as accessed Mar. 13, 2012, Code Green Networks, Inc., Technical White Paper, (2006).
"McAfee Data Loss Prevention (DLP)", http://www.mcafee.com/us/products/total-protection-for-data-loss-prevention.aspx, as accessed Mar. 13, 2012, (Jan. 13, 2012).
"Websense Data Loss Protection", http://www.websense.com/content/triton-ap-data.aspx, as accessed Mar. 13, 2012, (On or before Mar. 13, 2012).

* cited by examiner

(Continued)

*Primary Examiner* — Jean B Fleurantin
*Assistant Examiner* — Evan Aspinwall
(74) *Attorney, Agent, or Firm* — ALG Intellectual Property, LLC (57) ABSTRACT

A computer-implemented method for data loss prevention may include 1) identifying a file hierarchy within a file system (where, e.g., the file hierarchy includes a plurality of files and folders), 2) identifying a defined file hierarchy structure that is associated with a data loss prevention policy (where, e.g., the defined file hierarchy structure identifies the relative locations of files and folders), 3) determining that the file hierarchy is implicated in the data loss prevention policy by determining that the defined file hierarchy structure corresponds to the file hierarchy, and 4) applying the data loss prevention policy to at least a portion of the file hierarchy based on determining that the file hierarchy is implicated in the data loss prevention policy. Various other methods, systems, and computer-readable media are also disclosed.

19 Claims, 6 Drawing Sheets

SYSTEMS AND METHODS FOR DATA LOSS PREVENTION

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, smart mobile devices, and portable storage devices may pose unique challenges for individuals and organizations concerned with preventing the loss and/or exposure of sensitive data. Individuals and organizations are therefore increasingly looking to data loss prevention ("DLP") solutions to protect their sensitive data.

Conventional DLP systems typically attempt to protect sensitive data through the use of describing and fingerprinting technologies. Describing technologies typically involve identifying matches to keywords, expressions, patterns, and by performing other signature-based detection techniques. Fingerprinting technologies, on the other hand, typically involve identifying exact matches to whole or partial files. While potentially effective in protecting much of an organization's sensitive data, traditional fingerprinting and describing technologies may be computationally intensive. Furthermore, these traditional fingerprinting and describing technologies may be difficult to administer for some types of protected data (e.g., source code). Accordingly, the instant disclosure identifies a need for additional and improved systems and methods for data loss prevention.

SUMMARY

As will be described in greater detail below, the instant disclosure generally relates to systems and methods for preventing data loss by identifying protected data based on a predefined file hierarchy structure (by, e.g., identifying protected data at rest based on identifying a file tree matching a known file tree structure). In one example, a computer-implemented method for performing such a task may include 1) identifying a file hierarchy within a file system (where, e.g., the file hierarchy includes a plurality of files and folders), 2) identifying a defined file hierarchy structure that is associated with a data loss prevention policy (where, e.g., the defined file hierarchy structure identifies the relative locations of files and folders), 3) determining that the file hierarchy is implicated in the data loss prevention policy by determining that the defined file hierarchy structure corresponds to the file hierarchy, and 4) applying the data loss prevention policy to at least a portion of the file hierarchy based on or in response to the determination that the file hierarchy is implicated in the data loss prevention policy.

In some examples, identifying the file hierarchy may include identifying a file hierarchy including source code. In these examples, the defined file hierarchy structure may be identified in response to determining that the file hierarchy includes source code.

The file hierarchy structure may include any of a variety of information. For example, the file hierarchy structure may include 1) file type information, 2) file name information, 3) file size information, and/or 4) file hash information. In some examples, the data loss prevention policy may include at least one expected condition under which file hierarchies matching the defined file hierarchy structure are to be stored. In these examples, applying the data loss prevention policy may include determining that the file hierarchy is not stored within the file system under the expected condition.

In some embodiments, the computer-implemented may also include generating the defined file hierarchy structure. For example, the computer-implemented method may also include 1) identifying a folder including data subject to the data loss prevention policy and 2) crawling through a file structure starting from the folder as a root point to generate the defined file hierarchy structure.

In one example, determining that the defined file hierarchy structure corresponds to the file hierarchy may include determining that a similarity between the file hierarchy and the defined file hierarchy structure exceeds a predetermined threshold. Additionally or alternatively, determining that the defined file hierarchy structure corresponds to the file hierarchy may include determining that a branch of the defined file hierarchy structure matches the file hierarchy.

Applying the data loss prevention policy may include any of a variety of actions. For example, applying the data loss prevention policy may include 1) reporting a location of the file hierarchy to an administrator, 2) encrypting at least a portion of the file hierarchy, 3) deleting at least a portion of the file hierarchy from the file system, and 4) quarantining at least a portion of the file hierarchy.

In one embodiment, a system for implementing the above-described method may include 1) an identification module programmed to identify a file hierarchy within a file system (where, e.g., the file hierarchy includes a plurality of files and folders), 2) a structure module programmed to identify a defined file hierarchy structure that is associated with a data loss prevention policy (where, e.g., the defined file hierarchy structure identifies the relative locations of files and folders), 3) a determination module programmed to determine that the file hierarchy is implicated in the data loss prevention policy by determining that the defined file hierarchy structure corresponds to the file hierarchy, and 4) an application module programmed to apply the data loss prevention policy to at least a portion of the file hierarchy based on the determination that the file hierarchy is implicated in the data loss prevention policy. The system may also include at least one processor configured to execute the identification module, the structure module, the determination module, and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a file hierarchy within a file system (where, e.g., the file hierarchy includes a plurality of files and folders), 2) identify a defined file hierarchy structure that is associated with a data loss prevention policy (where, e.g., the defined file hierarchy structure identifies the relative locations of files and folders), 3) determine that the file hierarchy is implicated in the data loss prevention policy by determining that the defined file hierarchy structure corresponds to the file hierarchy, and 4) apply the data loss prevention policy to at least a portion of the file hierarchy based on the determination that the file hierarchy is implicated in the data loss prevention policy.

As will be explained in greater detail below, by identifying protected data based on a predefined file hierarchy structure (by, e.g., identifying protected data at rest based on identifying a file tree matching a known file tree structure), the systems and methods described herein may potentially identify protected data (and, accordingly, apply data loss prevention policies) more efficiently, more accurately, and/or with greater flexibility. As such, these systems and methods may identify complex directory structures that indicate sensitive data at rest with minimal or no analysis of the content of the sensitive data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
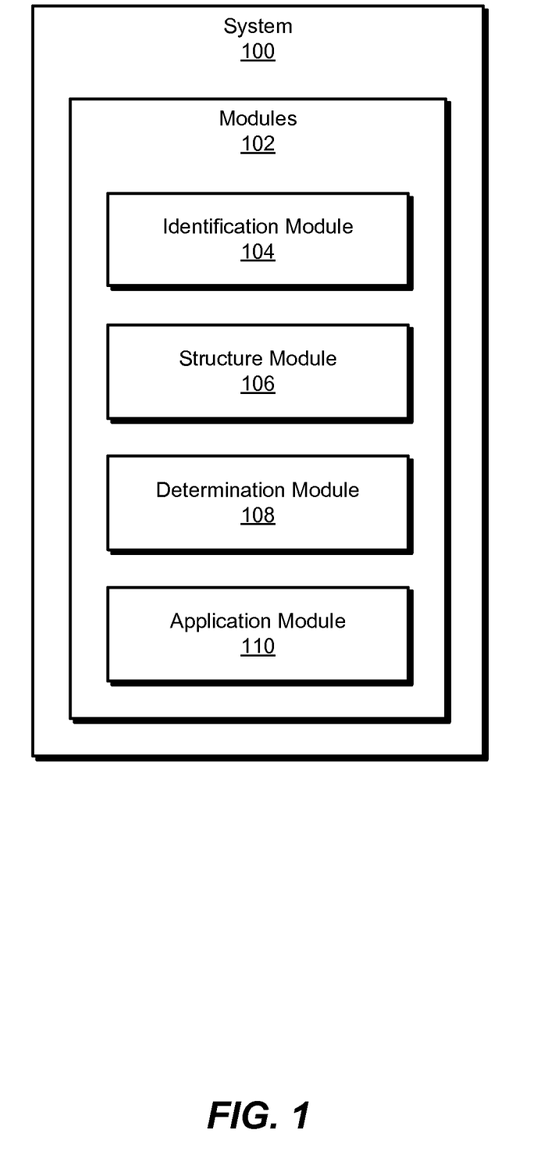
FIG. 1 is a block diagram of an exemplary system for data loss prevention.
Figure 2:
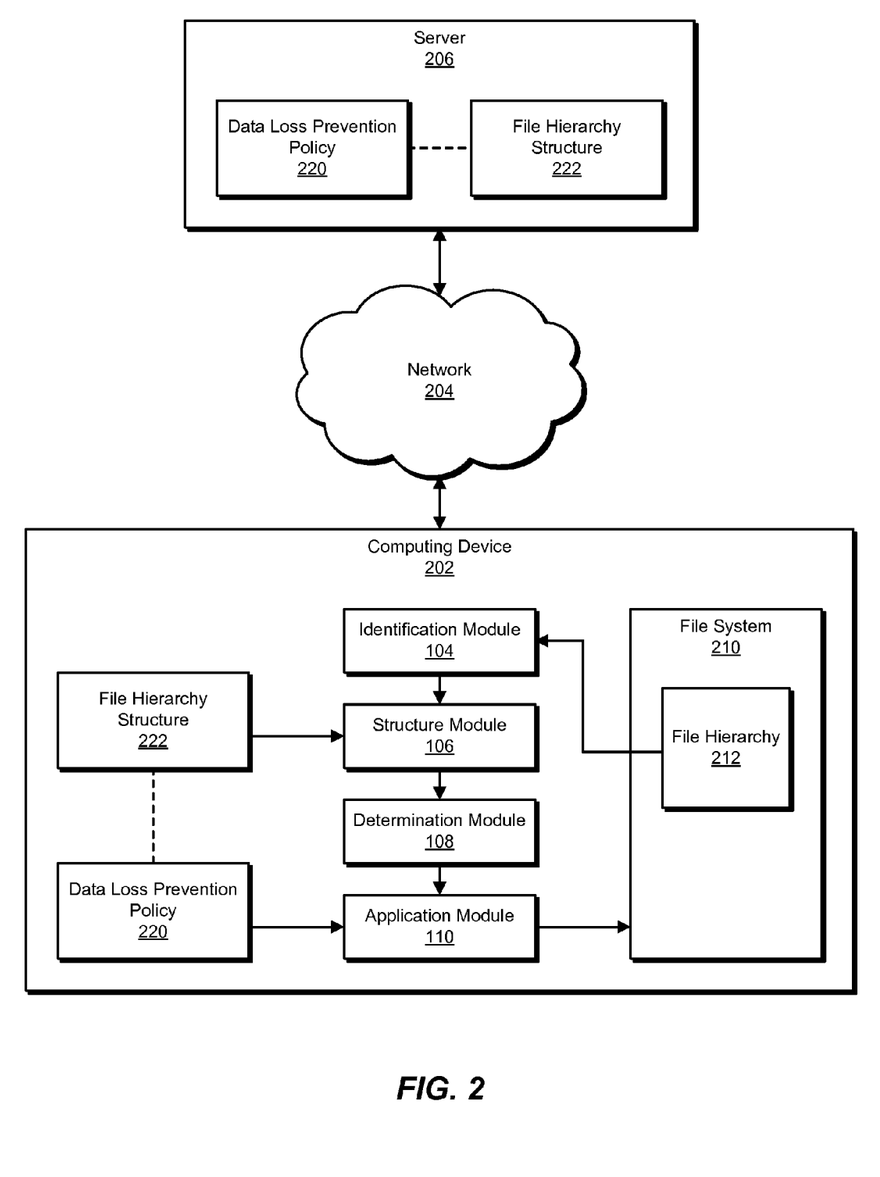
FIG. 2 is a block diagram of an exemplary system for data loss prevention.

The following will provide, with reference to FIGS. 1-2, detailed descriptions of exemplary systems for data loss prevention. Detailed descriptions of corresponding computer-implemented methods will also be provided in connection with FIG. 3. Detailed descriptions of exemplary file hierarchies will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for data loss prevention. As illustrated in this figure, exemplary system 100 may include one or more modules 102 for performing one or more tasks. For example, and as will be explained in greater detail below, exemplary system 100 may include an identification module 104 programmed to identify a file hierarchy within a file system (where, e.g., the file hierarchy includes a plurality of files and folders). Exemplary system 100 may also include a structure module 106 programmed to identify a defined file hierarchy structure that is associated with a data loss prevention policy (where, e.g., the defined file hierarchy structure identifies the relative locations of files and folders).

In addition, and as will be described in greater detail below, exemplary system 100 may include a determination module 108 programmed to determine that the file hierarchy is implicated in the data loss prevention policy by determining that the defined file hierarchy structure corresponds to the file hierarchy. Exemplary system 100 may also include an application module 110 programmed to apply the data loss prevention policy to at least a portion of the file hierarchy based on determining that the file hierarchy is implicated in the data loss prevention policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 (e.g., to retrieve data and/or instructions relating to data loss prevention) via a network 204.

In one embodiment, one or more of modules 102 from FIG. 1 may, when executed by at least one processor of computing device 202, facilitate computing device 202 in data loss prevention. For example, and as will be described in greater detail below, one or more of modules 102 may cause computing device 202 to 1) identify a file hierarchy 212 (which includes a plurality of files and folders) within a file system 210, 2) identify a defined file hierarchy structure 222 (which identifies the relative locations of files and folders) that is associated with a data loss prevention policy 220, 3) determine that file hierarchy 212 is implicated in data loss prevention policy 220 by determining that file hierarchy structure 222 corresponds to file hierarchy 212, and 4) apply data loss prevention policy 220 to at least a portion of file hierarchy 212 based on determining that file hierarchy 212 is implicated in data loss prevention policy 220.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of storing, relaying, facilitating, and/or enforcing one or more data loss prevention policies. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
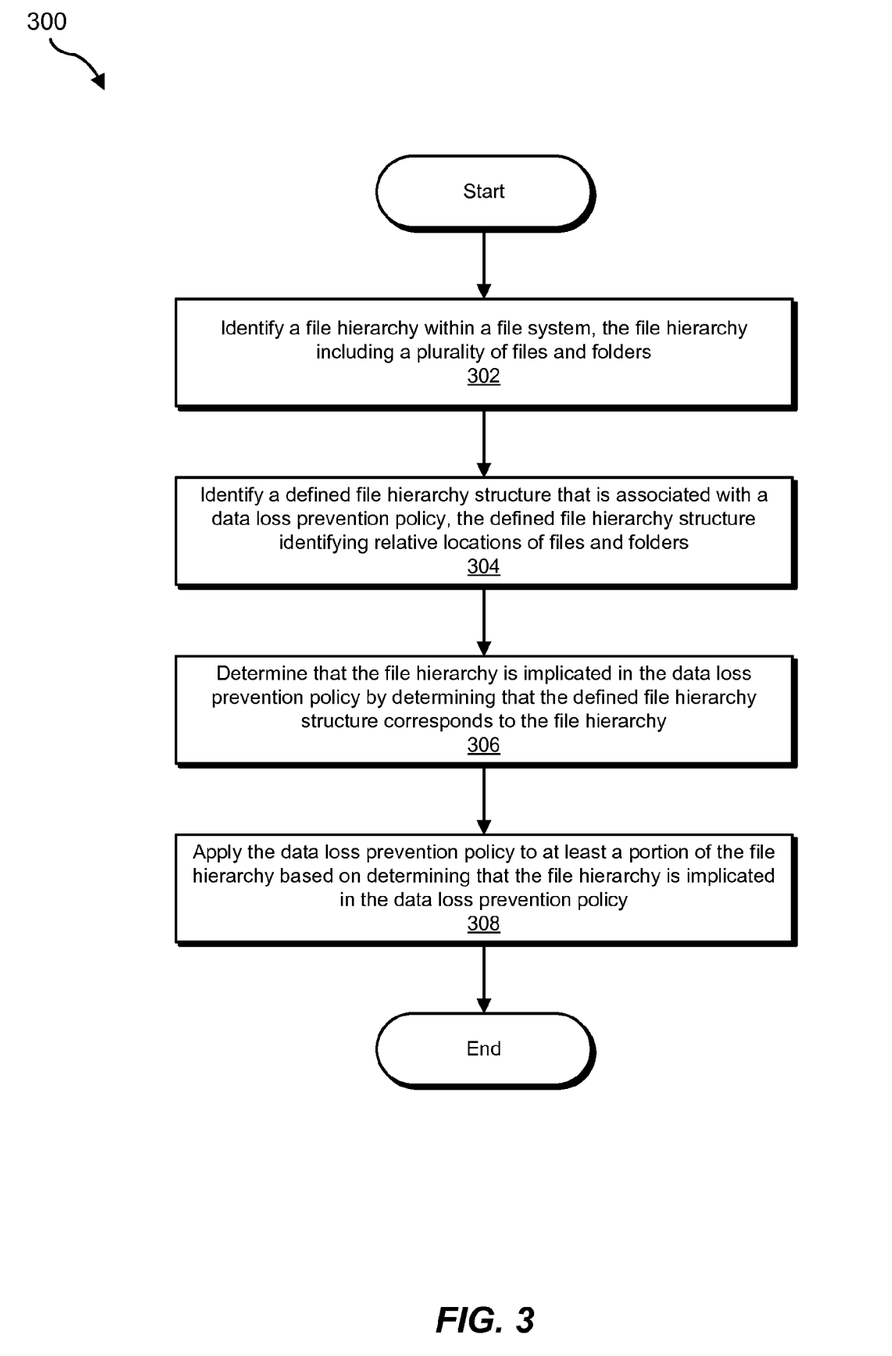
FIG. 3 is a flow diagram of an exemplary method for data loss prevention.

FIG. 3 is a flow diagram of an exemplary computer-implemented method 300 for data loss prevention. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a file hierarchy (which includes a plurality of files and folders) within a file system. For example, at step 302 identification module 104 may, as part of computing device 202 in FIG. 2, identify file hierarchy 212 within file system 210. In this example, file hierarchy 212 may include a plurality of files and folders.

As used herein, the term "file" may refer to any unit of data capable of being stored in a hierarchical structure, including, without limitation, files, data objects, and documents. Likewise, as used herein, the term "folder" may refer to any virtual container for organizing files within a hierarchy, including, without limitation, folders and directories. Additionally, as used herein, the phrase "file system" may refer to any system for organizing, managing, and/or storing files. Accordingly, as used herein, the phrase "file hierarchy" may refer to any combination of files and/or folders within a file system with reference to the hierarchical structure provided to the files and/or folders by the folders. For example, the phrase "file hierarchy" may refer to a folder and the organization of one or more files and/or folders within the folder.

Identification module 104 may identify the file hierarchy in any of a variety of contexts. For example, identification module 104 may identify the file hierarchy while scanning a volume of data for potentially sensitive data. Additionally or alternatively, identification module 104 may identify the file hierarchy by identifying the creation of the file hierarchy and/or a portion of the file hierarchy. In some examples, identification module 104 may identify the file hierarchy by receiving a query about the file hierarchy from an application (such as, e.g., a data loss prevention system).

In some examples, identification module 104 may, as a part of identifying the file hierarchy, identify or determine that the file hierarchy includes source code. For example, identification module 104 may identify the file hierarchy by identifying a source tree. As used herein, the phrase "source code" may refer to any file and/or data that may be used by a compiler to create an executable file (including, e.g., a stand-alone executable file, an object file, a library file, etc.). Accordingly, the phrase "source tree" may refer to any file hierarchy including one or more source code files, configuration files (e.g., makefiles), and any other incidental files for generating, maintaining, and/or compiling source code. As will be explained in greater detail below, in some examples one or more of the systems described herein may identify a file hierarchy structure subject to a data loss prevention policy based at least in part on determining that the file hierarchy includes source code.

Figure 4:
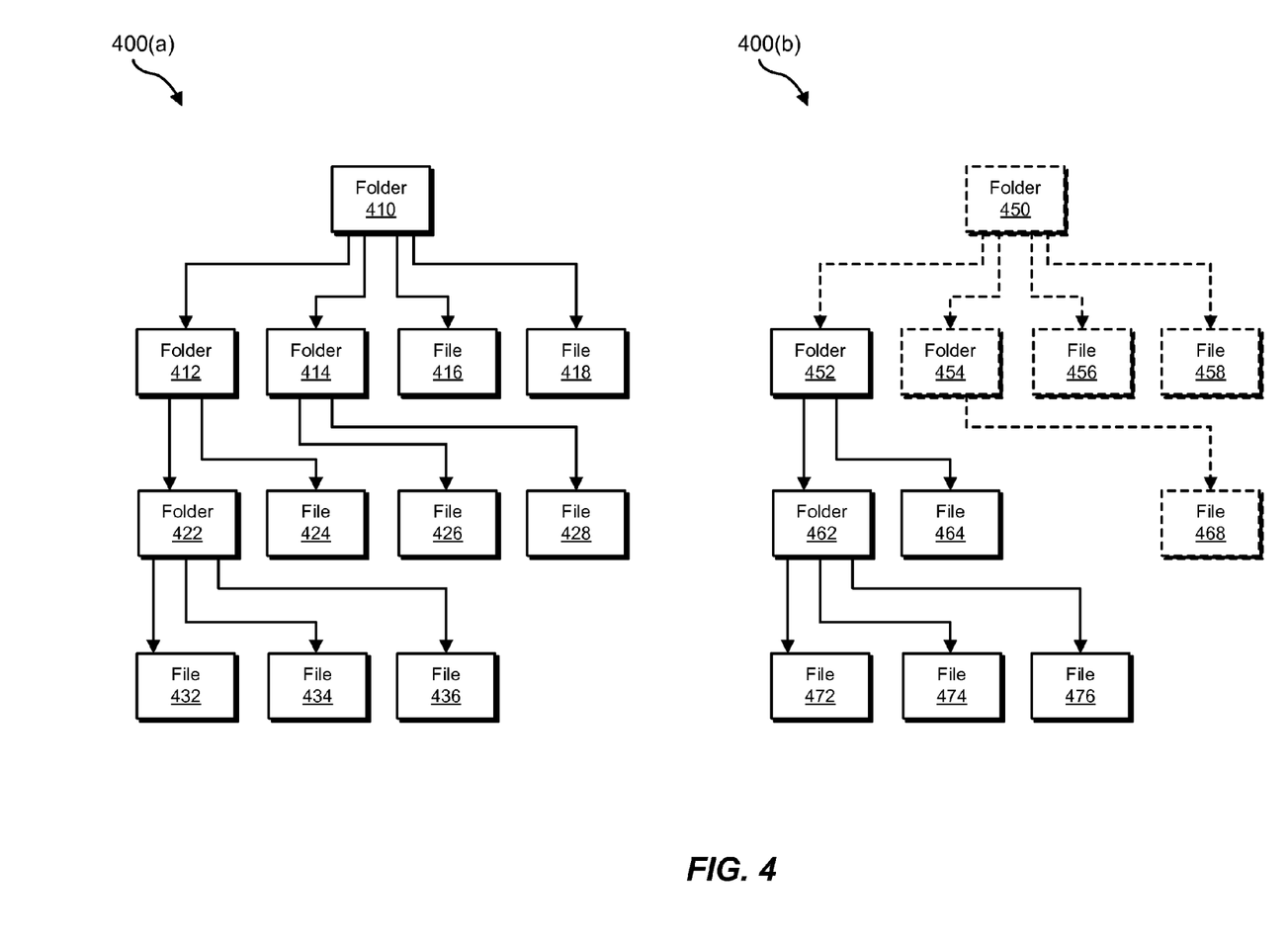
FIG. 4 is an illustration of exemplary file hierarchies.

FIG. 4 illustrates exemplary file hierarchies 400(a) and 400(b). As shown in FIG. 4, exemplary file hierarchy 400(a) may include a folder 410, a folder 412, a folder 414, a file 416, a file 418, a folder 422, a file 424, a file 426, a file 428, a file 432, a file 434, and a file 436. Likewise, file hierarchy 400(b) may include a folder 450, a folder 452, a folder 454, a file 456, a file 458, a folder 462, a file 464, a file 468, a file 472, a file 474, and a file 476. Using FIG. 4 as an example, at step 302 identification module 104 may identify file hierarchy 400(b).

Returning to FIG. 3, at step 304 one or more of the systems described herein may identify a defined file hierarchy structure (that identifies the relative locations of files and folders) that is associated with a data loss prevention policy. For example, at step 304 structure module 106 may, as part of computing device 202 in FIG. 2, identify defined file hierarchy structure 222 that is associated with data loss prevention policy 220. In this example, file hierarchy structure 222 may identify the relative locations of files and folders.

The file hierarchy structure may contain any of a variety of information about one or more folders and/or files. For example, the file hierarchy structure may identify a file name for one or more files and/or folders within the file hierarchy structure. Additionally or alternatively, the file hierarchy structure may identify a file type for one or more files within the file hierarchy structure (e.g., whether each file is a word processing document, a multimedia file, an executable file, a configuration file, a source code file, etc.). In some examples, the file hierarchy structure may identify file size information for one or more files within the file hierarchy structure (e.g., precise sizes, size ranges, etc.). Additionally or alternatively, the file hierarchy structure may identify file hash information for one or more files within the file hierarchy structure. The term "hash," as used herein, may refer to any type of fingerprint, hash function output, checksum, and/or digital signature that is derived from a file. In some examples, the file hash information may apply only to a limited portion of a file and/or to files of limited sizes. Generally, the file hierarchy structure may include any information useful for identifying a file hierarchy. For example, the file hierarchy structure may include one or more file and/or folder attributes.

As used herein, the phrase "data loss prevention policy" may refer to a policy and/or rule that describes, defines, or otherwise identifies content that an organization desires to protect and/or measures to identify and/or protect such content. In some examples, the phrase "data loss prevention policy" may refer to a policy for enforcing one or more rules for data at rest (e.g., where and how certain sensitive data may be stored). In some examples, the data loss prevention policy may include at least one expected condition under which file hierarchies matching the defined file hierarchy structure are to be stored. For example, the data loss prevention policy may include a condition that file hierarchies matching the defined file hierarchy structure are only to be accessible to a predefined set of users. In some examples, a data loss prevention system may include multiple data loss prevention policies specifying differing conditions for storing file hierarchies matching varying predefined file hierarchy structures.

The file hierarchy structure may come from any of a variety of sources. In some examples, one or more of the systems described herein may generate the defined file hierarchy structure. For example, structure module 106 may have previously identified a folder (e.g., on a volume of data separate from the volume of data including the file hierarchy) including data subject to the data loss prevention policy. Structure module 106 may have then crawled through a file structure starting from the folder as a root point to generate the defined file hierarchy structure. Structure module 106 may have then, e.g., submitted the defined file hierarchy structure to a database for future use and/or reference by a data loss prevention system and/or policy.

In some examples, an administrator may have identified a folder representing a file hierarchy of sensitive data. In these examples, structure module 106 may have crawled through the file structure starting from the administrator-identified folder to generate the defined file hierarchy structure. Additionally or alternatively, an administrator may have manually generated and/or defined the defined file hierarchy structure.

Structure module 106 may identify the defined file hierarchy structure in any suitable context. As mentioned earlier, in some examples one or more of the systems described herein (e.g., identification module 104) may, as a part of identifying the file hierarchy, identify that the file hierarchy includes source code. In these examples, structure module 106 may identify a file hierarchy structure subject to a data loss prevention policy based at least in part on determining that the file hierarchy includes source code. For example, structure module 106 may be configured to use a file hierarchy structure database to determine whether any given source tree is implicated in a data loss prevention policy.

Structure module 106 may identify the defined file hierarchy structure in any suitable manner. For example, structure module 106 may identify a reference to the defined file hierarchy structure (and/or a group of file hierarchy structures including the defined file hierarchy structure) in the data loss prevention policy. Additionally or alternatively, structure module 106 may identify the defined file hierarchy structure by querying a file hierarchy structure database for use in data loss prevention.

Using FIG. 4 as an example, at step 304 structure module 106 may identify file hierarchy structure 400(a) (e.g., starting with folder 410). In this example, file hierarchy structure 400(a) may be referenced by the data loss prevention policy (e.g., placing one or more restrictions on file hierarchies matching file hierarchy structure 400(a)).

Returning to FIG. 3, at step 306 one or more of the systems described herein may determine that the file hierarchy is implicated in the data loss prevention policy by determining that the defined file hierarchy structure corresponds to the file hierarchy. For example, at step 306 determination module 108 may, as part of computing device 202 in FIG. 2, determine that file hierarchy 212 is implicated in data loss prevention policy 220 by determining that file hierarchy structure 222 corresponds to file hierarchy 212.

Determination module 108 may determine that the defined file hierarchy structure corresponds to the file hierarchy in any of a variety of ways. For example, determination module 108 may determine that the defined file hierarchy structure corresponds to the file hierarchy by determining that there exists a one-to-one mapping between each file and/or folder within the defined file hierarchy structure and the file hierarchy (e.g., including file names, file sizes, etc.).

In some examples, determination module 108 may determine that the defined file hierarchy structure corresponds to the file hierarchy by determining that a similarity between the file hierarchy and the defined file hierarchy structure exceeds a predetermined threshold. For example, determination module 108 may use one or more distance and/or difference algorithms to determine how closely the file hierarchy matches the defined file hierarchy structure.

In some examples, determination module 108 may determine that the defined file hierarchy structure corresponds to the file hierarchy by determining that a branch of the defined file hierarchy structure matches the file hierarchy. For example, determination module 108 may determine that the file hierarchy represents the defined file hierarchy structure starting from a subfolder of the defined file hierarchy structure.

Using FIG. 4 as an example, at step 306 determination module 108 may determine that file hierarchy 400(b) corresponds to file hierarchy structure 400(a). For example, determination module 108 may determine that folder 450 corresponds to folder 410, that folder 452 corresponds to folder 412, folder 454 corresponds to folder 414, file 456 corresponds to file 416, file 458 corresponds to 418, folder 462 corresponds to folder 422, file 464 corresponds to file 424, file 468 corresponds to file 428, file 472 corresponds to file 432, file 474 corresponds to file 434, and file 476 corresponds to file 436. Determination module 108 may also determine that file hierarchy 400(b) does not include any file corresponding to file 426 in file hierarchy structure 400(a). However, determination module 108 may determine that the 11 matches and 1 miss between files and folders of file hierarchy 400(b) and file hierarchy structure 400(a) collectively indicate a match between file hierarchy structure 400(a) and file hierarchy 400(b).

In one example, file hierarchy 400(b) may only include folder 452 and its contents (e.g., file 464 and folder 462 with files 472, 474, and 476). In this example, determination module 108 may determine that file hierarchy 400(b) corresponds to file hierarchy structure 400(a) by determining that file hierarchy 400(b) matches a branch of file hierarchy structure 400(a) (i.e., folder 412 and its contents).

Returning to FIG. 3, at step 308 one or more of the systems described herein may apply the data loss prevention policy to at least a portion of the file hierarchy based on or in response to determining that the file hierarchy is implicated in the data loss prevention policy. For example, at step 308 application module 110 may, as part of computing device 202 in FIG. 2, apply data loss prevention policy 220 to at least a portion of file hierarchy 212 based on determining that file hierarchy 212 is implicated in data loss prevention policy 220.

As mentioned earlier, in some examples, the data loss prevention policy may include at least one expected condition under which file hierarchies matching the defined file hierarchy structure are to be stored. In these examples, application module 110 may determine that the file hierarchy is not stored within the file system under the expected condition. For example, the data loss prevention policy may include a condition that file hierarchies matching the defined file hierarchy structure are only to be accessible to a predefined set of users. Accordingly, application module 110 may determine that the file hierarchy is stored in a location accessible to and/or with permissions granting access to one or more users outside the predefined set of users.

Application module 110 may take any of a variety of actions as specified by the data loss prevention policy. For example, application module 110 may report a location of the file hierarchy to an administrator (e.g., including information about the defined file hierarchy structure in the report). Additionally or alternatively, application module 110 may encrypt at least a portion of the file hierarchy (e.g., a portion of the file hierarchy marked as sensitive within the defined file hierarchy structure). In some examples, application module 110 may delete at least a portion of the file hierarchy from the file system (e.g., a portion of the file hierarchy marked as sensitive within the defined file hierarchy structure). In one example, application module 110 may quarantine at least a portion of the file hierarchy (e.g., a portion of the file hierarchy marked as sensitive within the defined file hierarchy structure).

Using FIG. 4 as an example, application module 110 may report the location of file hierarchy 400(b) to an administrator (e.g., by reporting the path of file 450) and/or encrypt, delete, and/or quarantine one or more files and/or folders within file hierarchy 400(b).

As explained above, by identifying protected data based on a predefined file hierarchy structure (by, e.g., identifying protected data at rest based on identifying a file tree matching a known file tree structure), the systems and methods described herein may potentially identify protected data (and, accordingly, apply data loss prevention policies) more efficiently, more accurately, and/or with greater flexibility. As such, these systems and methods may identify complex directory structures that indicate sensitive data at rest with minimal or no analysis of the content of the sensitive data.

Figure 5:
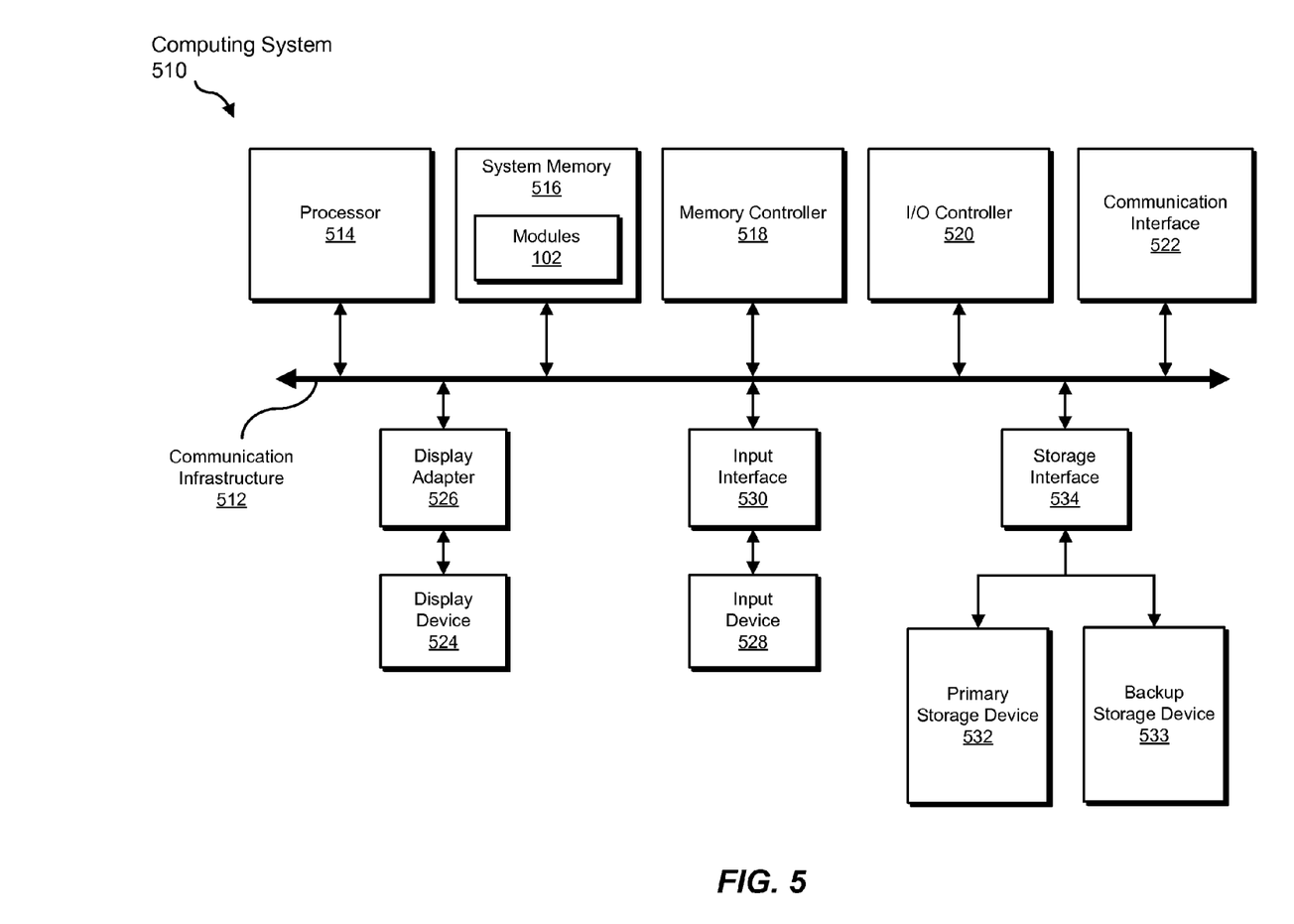
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, crawling, determining, applying, reporting, encrypting, deleting, and quarantining steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
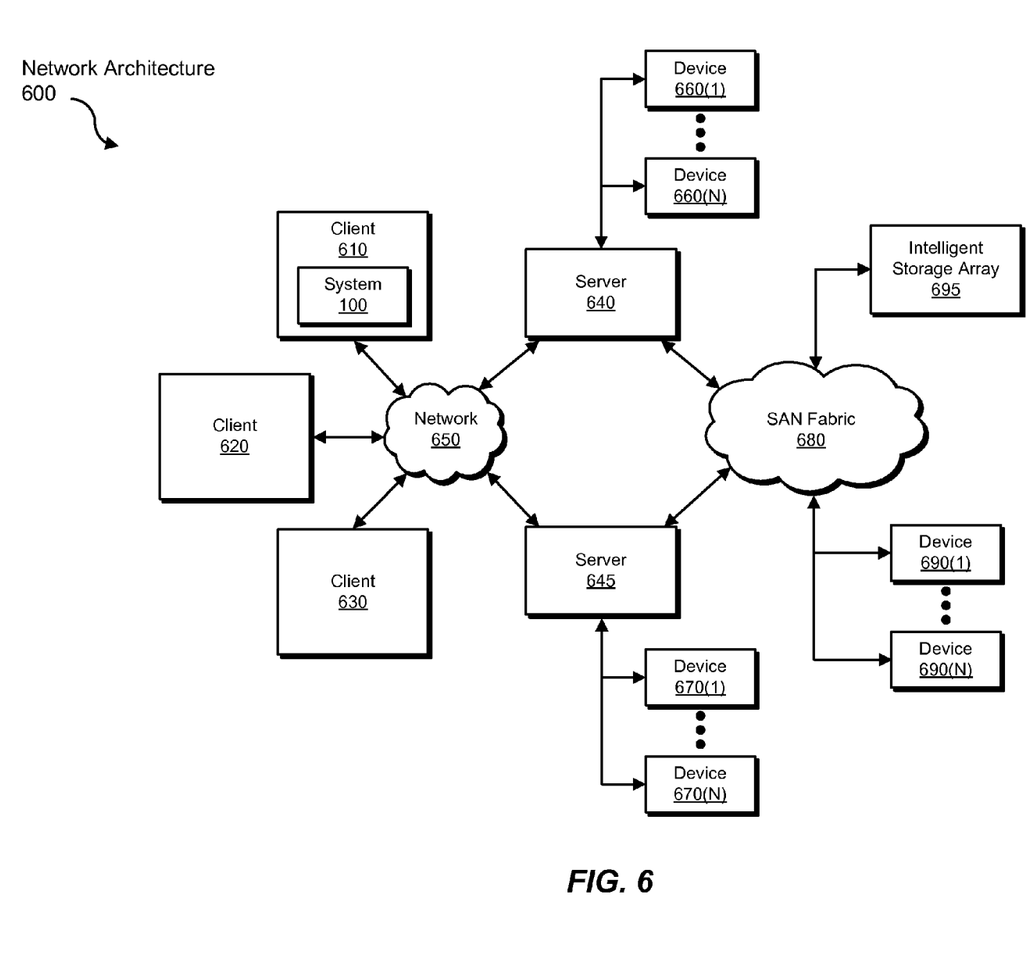
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, crawling, determining, applying, reporting, encrypting, deleting, and quarantining steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for data loss prevention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for data loss prevention.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention, at least a portion of the method being performed by a computing device comprising at least one processor, the method comprising:
    identifying a file tree within a file system, the file tree comprising a plurality of files and folders;
    identifying a defined file tree structure that is associated with a data loss prevention policy, the defined file tree structure identifying relative locations of files and folders within the defined file tree structure, wherein the defined file tree structure comprises at least one of:
    file type information;
    file name information;
    file size information;
    file hash information;
    determining that the file tree is implicated in the data loss prevention policy by determining that the defined file tree structure corresponds to the file tree;
    applying the data loss prevention policy to at least a portion of the file tree, based on determining that the file tree is implicated in the data loss prevention policy, to protect data stored within the file tree.

2. The computer-implemented method of claim 1, wherein determining that the defined file tree structure corresponds to the file tree comprises determining that a similarity between the file tree and the defined file tree structure exceeds a predetermined threshold.

3. The computer-implemented method of claim 1, wherein determining that the defined file tree structure corresponds to the file tree comprises determining that a branch of the defined file tree structure matches the file tree.

4. The computer-implemented method of claim 1, further comprising:
    identifying a folder comprising data subject to the data loss prevention policy;
    crawling through a file structure starting from the folder as a root point to generate the defined file tree structure.

5. The computer-implemented method of claim 1, wherein:
    identifying the file tree comprises identifying a file tree comprising source code;
    the defined file tree structure is identified in response to determining that the file tree comprises source code.

6. The computer-implemented method of claim 1, wherein applying the data loss prevention policy comprises at least one of:
    reporting a location of the file tree to an administrator;
    encrypting at least a portion of the file tree;

deleting at least a portion of the file tree from the file system;
quarantining at least a portion of the file tree.

7. The computer-implemented method of claim 1, wherein:
the data loss prevention policy comprises at least one expected condition under which file hierarchies matching the defined file tree structure are to be stored;
applying the data loss prevention policy to the file tree comprises determining that the file tree is not stored within the file system under the expected condition.

8. The computer-implemented method of claim 1, wherein determining that the defined file tree structure corresponds to the file tree comprises determining that a branch of the file tree that comprises multiple sub-branches matches a branch of the defined file tree structure that comprises matching multiple sub-branches.

9. A system for data loss prevention, the system comprising:
an identification module programmed to identify a file tree within a file system, the file tree comprising a plurality of files and folders;
a structure module programmed to identify a defined file tree structure that is associated with a data loss prevention policy, the defined file tree structure identifying relative locations of files and folders within the defined file tree structure, wherein the defined file tree structure comprises at least one of:
file type information;
file name information;
file size information;
file hash information;
a determination module programmed to determine that the file tree is implicated in the data loss prevention policy by determining that the defined file tree structure corresponds to the file tree;
an application module programmed to apply the data loss prevention policy to at least a portion of the file tree, based on determining that the file tree is implicated in the data loss prevention policy, to protect data stored within the file tree;
at least one processor configured to execute the identification module, the structure module, the determination module, and the application module.

10. The system of claim 9, wherein the determination module is programmed to determine that the defined file tree structure corresponds to the file tree by determining that a similarity between the file tree and the defined file tree structure exceeds a predetermined threshold.

11. The system of claim 9, wherein the determination module is programmed to determine that the defined file tree structure corresponds to the file tree by determining that a branch of the defined file tree structure matches the file tree.

12. The system of claim 9, wherein the structure module is further programmed to:
identify a folder comprising data subject to the data loss prevention policy;
crawl through a file structure starting from the folder as a root point to generate the defined file tree structure.

13. The system of claim 9, wherein:
the identification module is programmed to identify the file tree by identifying a file tree comprising source code;
the structure module is programmed to identify the defined file tree structure in response to determining that the file tree comprises source code.

14. The system of claim 9, wherein the application module is programmed to apply the data loss prevention policy by at least one of:
reporting a location of the file tree to an administrator;
encrypting at least a portion of the file tree;
deleting at least a portion of the file tree from the file system;
quarantining at least a portion of the file tree.

15. The system of claim 9, wherein:
the data loss prevention policy comprises at least one expected condition under which file hierarchies matching the defined file tree structure are to be stored;
the application module is programmed to apply the data loss prevention policy to the file tree by determining that the file tree is not stored within the file system under the expected condition.

16. A non-transitory computer-readable-storage medium comprising one or more computer-executable instructions that, when executed by at least one processor of a computing device, cause the computing device to:
identify a file tree within a file system, the file tree comprising a plurality of files and folders;
identify a defined file tree structure that is associated with a data loss prevention policy, the defined file tree structure identifying relative locations of files and folders within the defined file tree structure, wherein the defined file tree structure comprises at least one of:
file type information;
file name information;
file size information;
file hash information;
determine that the file tree is implicated in the data loss prevention policy by determining that the defined file tree structure corresponds to the file tree;
apply the data loss prevention policy to at least a portion of the file tree, based on determining that the file tree is implicated in the data loss prevention policy, to protect data stored within the file tree.

17. The non-transitory computer-readable-storage medium of claim 16, wherein the one or more computer-executable instructions cause the computing device to determine that the defined file tree structure corresponds to the file tree by causing the computing device to determine that a similarity between the file tree and the defined file tree structure exceeds a predetermined threshold.

18. The non-transitory computer-readable-storage medium of claim 16, wherein the one or more computer-executable instructions cause the computing device to determine that the defined file tree structure corresponds to the file tree by causing the computing device to determine that a branch of the defined file tree structure matches the file tree.

19. The non-transitory computer-readable-storage medium of claim 16, wherein the one or more computer-executable instructions further cause the computing device to:
Identify a folder comprising data subject to the data loss prevention policy;
crawl through a file structure starting from the folder as a root point to generate the defined file tree structure.

* * * * *